United States Patent
Hori et al.

(10) Patent No.: US 9,921,792 B2
(45) Date of Patent: Mar. 20, 2018

(54) VEHICLE INFORMATION DISPLAY APPARATUS

(71) Applicant: TOYOTA JIDOSHA KABUSHIKI KAISHA, Toyota-shi, Aichi-ken (JP)

(72) Inventors: Keigo Hori, Toyota (JP); Hiroyasu Ishioka, Toyota (JP); Yukihiko Yamazaki, Nagoya (JP); Takashi Yanatsubo, Toyota (JP); Hisashi Fujiwara, Nagoya (JP); Yohsuke Hemuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 14/564,458

(22) Filed: Dec. 9, 2014

(65) Prior Publication Data
US 2015/0227335 A1 Aug. 13, 2015

(30) Foreign Application Priority Data

Feb. 10, 2014 (JP) .................................. 2014-023647

(51) Int. Cl.
*G06F 3/00* (2006.01)
*G06F 3/14* (2006.01)
(Continued)

(52) U.S. Cl.
CPC ............ *G06F 3/1423* (2013.01); *B60K 37/00* (2013.01); *G06F 3/02* (2013.01); *G06F 3/0202* (2013.01);
(Continued)

(58) Field of Classification Search
CPC ..... B60K 37/00; G06F 3/0202; G06F 3/1423; G06F 3/02; G06F 3/04847; G06F 3/04842
(Continued)

(56) References Cited

U.S. PATENT DOCUMENTS 6,667,726 B1 * 12/2003 Damiani ................ B60K 35/00
340/461
6,781,610 B2 8/2004 Os et al.
(Continued)

FOREIGN PATENT DOCUMENTS

DE 102007001317 A1 7/2008
JP H07-84725 A 3/1995
(Continued)

*Primary Examiner* — Henry Orr
(74) *Attorney, Agent, or Firm* — Oliff PLC

(57) ABSTRACT

A vehicle information display apparatus includes display areas displaying information concerning an in-vehicle device and displaying an operation screen page for operating the in-vehicle device; an operating part for performing an operation on the operation screen page and a control part receiving an operation signal corresponding to the operation performed on the operating part, controlling a display on the plurality of display areas and determining, based on the operation signal, an operation valid display area from among the display areas. The control part executes the operation on the operation screen page in the operation valid display area based on the operation signal corresponding to a first operation performed on the operation part. The control part changes the operation valid display area based on the operation signal corresponding to a second operation performed on the operating part.

1 Claim, 10 Drawing Sheets

(51) Int. Cl.
*G06F 3/02* (2006.01)
*G06F 3/0484* (2013.01)
*B60K 37/00* (2006.01)

(52) U.S. Cl.
CPC ...... *G06F 3/04842* (2013.01); *G06F 3/04847* (2013.01); *G09G 2380/10* (2013.01)

(58) Field of Classification Search
USPC .......................................................... 715/761
See application file for complete search history.

(56) References Cited

U.S. PATENT DOCUMENTS

| | | | | |
|---|---|---|---|---|
| 6,998,976 B2 * | 2/2006 | Kawai | ................... | B60K 37/06 340/461 |
| 7,321,318 B2 * | 1/2008 | Crane | ................. | G01C 23/005 340/971 |
| 2002/0171627 A1 * | 11/2002 | Noguchi | ................ | B60K 37/06 345/156 |
| 2003/0234764 A1 * | 12/2003 | Noguchi | ................. | B60R 11/02 345/156 |
| 2005/0138662 A1 * | 6/2005 | Seto | ........................ | H04N 5/775 725/75 |
| 2006/0101354 A1 * | 5/2006 | Hashimoto | ......... | G06F 3/04845 715/863 |
| 2006/0277503 A1 | 12/2006 | Maehiro et al. | | |
| 2007/0126698 A1 * | 6/2007 | Iwamoto | ............ | G01C 21/3664 345/156 |
| 2009/0171529 A1 * | 7/2009 | Hayatoma | .............. | B60K 35/00 701/36 |
| 2010/0302018 A1 | 12/2010 | Tuzar et al. | | |
| 2011/0004822 A1 * | 1/2011 | Nezu | ...................... | B60K 35/00 715/702 |
| 2012/0050028 A1 * | 3/2012 | Mastronardi | .......... | B60K 37/00 340/441 |
| 2012/0072109 A1 * | 3/2012 | Waite | ..................... | B60K 35/00 701/431 |
| 2012/0153656 A1 * | 6/2012 | Casey | .................... | B60K 37/00 296/1.08 |
| 2012/0319828 A1 * | 12/2012 | Krauss | .................. | B60K 35/00 340/425.5 |
| 2013/0030660 A1 * | 1/2013 | Fujimoto | ............ | F02N 11/0803 701/50 |
| 2013/0204459 A1 * | 8/2013 | Enami | ................... | B60K 37/06 701/1 |
| 2013/0293452 A1 * | 11/2013 | Ricci | ...................... | G02B 27/01 345/156 |
| 2014/0365126 A1 * | 12/2014 | Vulcano | ................. | G01C 21/36 701/533 |
| 2015/0066247 A1 * | 3/2015 | Dale | ........................ | G08C 17/02 701/2 |

FOREIGN PATENT DOCUMENTS

| | | |
|---|---|---|
| JP | H11-119754 A | 4/1999 |
| JP | 2003-005735 A | 1/2003 |
| JP | 2003-096629 A | 4/2003 |
| JP | A-2004-38260 | 2/2004 |
| JP | 2006-331036 A | 12/2006 |
| JP | 2007-153194 A | 6/2007 |
| JP | A-2007-153194 | 6/2007 |
| JP | 2008-030674 A | 2/2008 |
| JP | 2012-073771 A | 4/2012 |
| JP | A-2012-118535 | 6/2012 |
| WO | 2009/033518 A1 | 3/2009 |

* cited by examiner

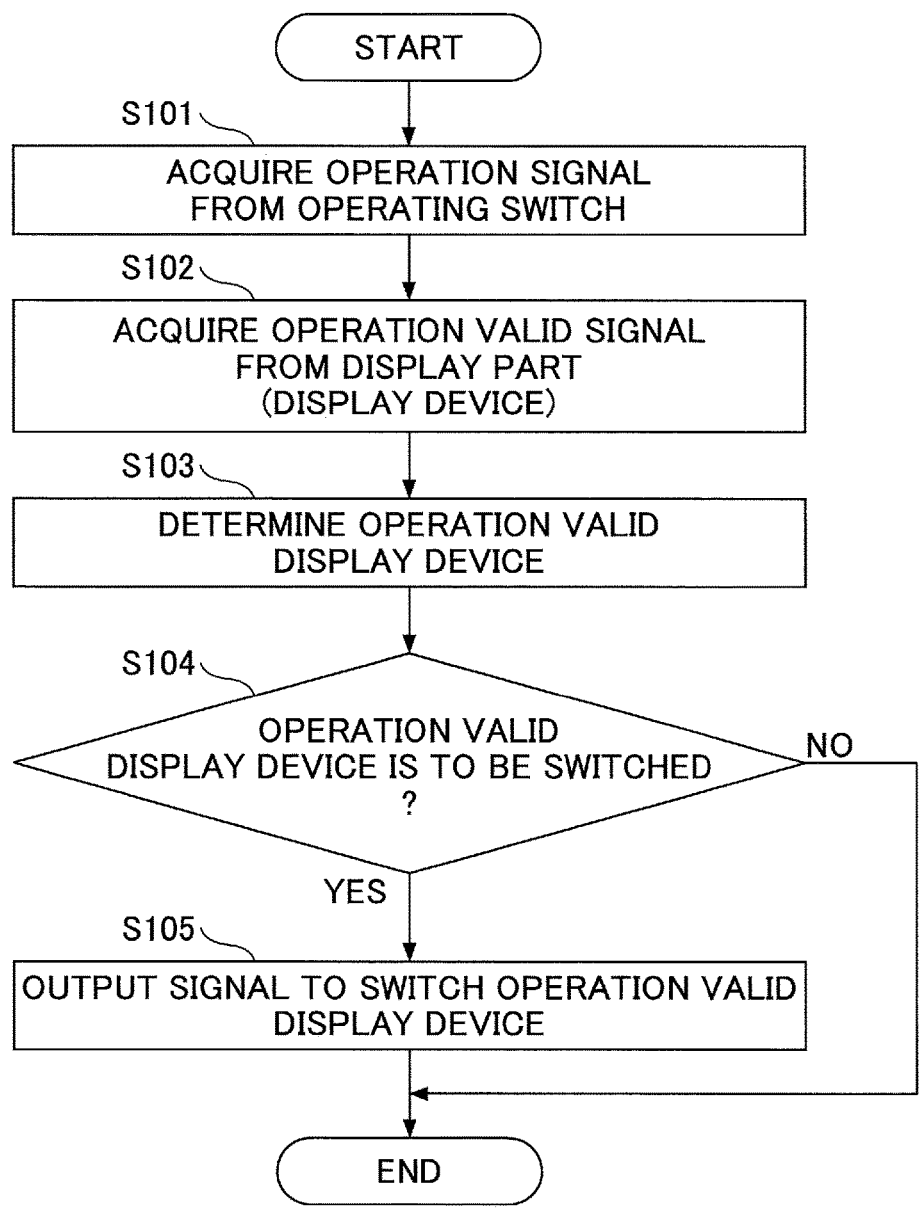

VEHICLE INFORMATION DISPLAY APPARATUS

BACKGROUND OF THE INVENTION

1. Field of the Invention

The present invention relates to a vehicle information display apparatus for displaying information according to an operation performed by an occupant of a vehicle.

2. Description of the Related Art

In the related art, an information display apparatus is known including a plurality of display devices, an operating switch to be operated in common on operation screen pages displayed on the plurality of display devices and a changeover switch for switching the display device in which an operation performed by using the operating switch is valid (for example, see Japanese Laid-Open Patent Application 2007-153194). Thereby, it is possible to reduce the troublesomeness in operations by using the common operating switch while it is possible to present a greater amount of information to the occupants by using the plurality of display devices.

SUMMARY OF THE INVENTION

According to an aspect of the present invention, a vehicle information display apparatus includes a plurality of display areas configured to display information concerning an in-vehicle device and be capable of displaying an operation screen page used for operating the in-vehicle device; an operating part configured to be used for performing an operation on the operation screen page displayed in the plurality of display areas; and a control part configured to receive an operation signal corresponding to the operation performed by using the operating part, control a display on the plurality of display areas and determine, based on the operation signal, an operation valid display area from among the plurality of display areas as a display area in which the operation performed by using the operating part is valid. The control part is configured to execute, when a first operation is performed by using the operating part, the operation on the operation screen page in the operation valid display area based on the operation signal corresponding to the first operation. The control part is configured to change the operation valid display area based on the operation signal corresponding to a second operation when the second operation is performed by using the operating part.

Other objects, features and advantages of the present invention will become more apparent from the following detailed description when read in conjunction with the accompanying drawings.

BRIEF DESCRIPTION OF THE DRAWINGS

FIG. 3 is a flowchart illustrating one example of a process of switching an operation valid display device in the vehicle information display apparatus (a control part);

DETAILED DESCRIPTION OF THE EMBODIMENTS

Below, using the accompanying drawings, the embodiments of the present invention will be described.

In the related art described above, a special changeover switch is provided other than the operating switch for switching the display device in which an operation performed by using the operating switch is valid. Thus, a problem may occur as mentioned below.

For example, due to a restriction concerning hardware of the information display apparatus or so, it may be impossible to install the changeover switch itself. Further, since a task of the operator may occur to determine the current position in the changeover switch at a time of operation, the operability of the information display apparatus may be degraded.

An object of the embodiments is to provide a vehicle information display apparatus in which it is possible to switch a display area or display device among a plurality of display areas or display devices, in which an operation performed by using an operating device is valid, by using the single operating device also used for operating the plurality of display areas or display devices.

By the embodiments, it is possible to provide a vehicle information display apparatus in which it is possible to switch a display area or display device among a plurality of display areas or display devices, in which an operation performed by using an operating device is valid, by using the single operating device also used for operating the plurality of display areas or display devices.

First Embodiment

Figure 1:
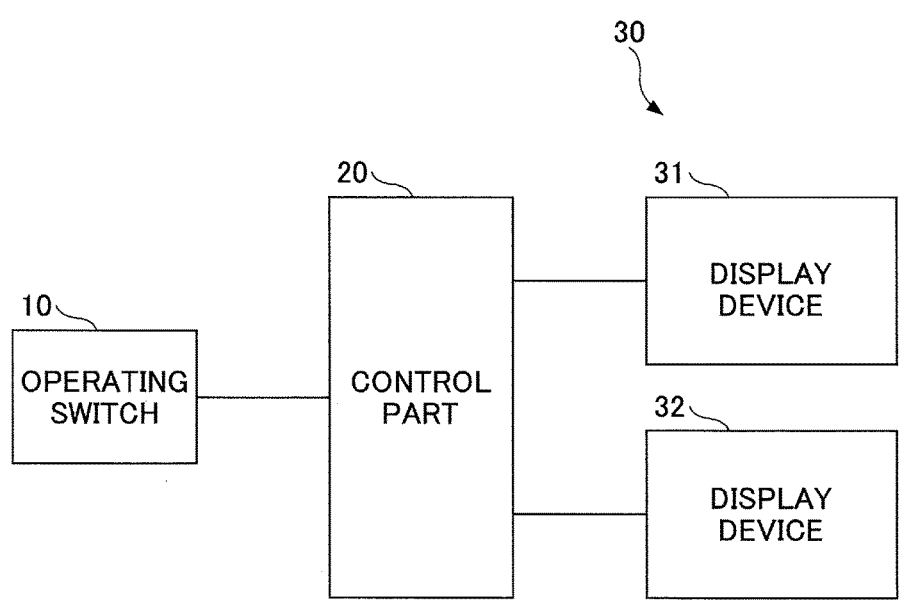
FIG. 1 is a block diagram illustrating one example of a configuration of a vehicle information display apparatus.

FIG. 1 is a block diagram illustrating one example of a configuration of a vehicle information display apparatus 1. The vehicle information display apparatus 1 according to the first embodiment includes a plurality of display devices which display various information (information screen pages) in response to an operation performed by the driver of a vehicle or so. Further, the vehicle information display apparatus 1 is configured to be capable of displaying an operation screen page for an in-vehicle device on the plurality of display devices. Then, in response to an operation performed by the driver or so on the operation screen page, a predetermined operation in the in-vehicle device can be carried out.

The vehicle information display apparatus 1 includes an operating switch 10, a control part 20 and a display part 30.

The operating switch 10 is an operating part for performing an operation on the operation screen page for the in-vehicle device displayed on the plurality of display devices included in the display part 30. As the in-vehicle device, a car navigation system, an audio system, an air conditioner and/or the like can be included. Specifically, the operating switch 10 can include a switch for selecting an operation target (an operation menu) included in each operation screen page displayed on the plurality of display devices (for example, a direction instruction switch for moving among the operation menus), a fixing switch for fixing a selection of a menu once selected and so forth. Further, the operating switch 10 is configured to be capable of switching a display device among the plurality of display devices included in the display part 30 in which an operation performed on the operating switch 10 is valid (hereinafter, referred to as an "operation valid display device"). The operating switch 10 is connected with the control part 20 in a manner capable of communication therebetween through an in-vehicle LAN such as a Controller Area Network (CAN), a direct line or so. As a result, an operation signal that is output when the operating switch 10 is operated by the driver or so is transmitted to the control part 20.

The control part 20 is a control part that controls displaying various information (information screen pages), the operation screen page and so forth on the plurality of display devices included in the display part 30. The control part 20 is connected with the operating switch 10, the display part 30 including the plurality of display devices, the in-vehicle devices (navigation system, air conditioner, audio system and so forth) in a manner capable of communication thereamong through an in-vehicle LAN such as a Controller Area Network (CAN), a direct line or so. Specifically, the control part 20 includes a microcomputer. By executing various programs stored in a ROM by a CPU, various control processes described later can be carried out by the control part 20. For example, the control part 20 can execute various operations on the operation screen pages for the in-vehicle devices according to the operation signals received from the operating switch 10. More specifically, according to the operation signals received from the operating switch 10, switching selection (changing selection) of an operation menu among a plurality of operation menus on each operation screen page or fixing the selection of the operation menus can be carried out by the control part 20. Further, the control part 20 can determine the operation valid display device according to the operation signal received from the operating switch 10. Further, the control part 20 can change (switch) the operation valid display device according to a corresponding instruction or so. Details of a process of changing the operation valid display device according to an operation performed by using the operating switch 10 will be described later.

The display part 30 is a display part including the plurality of display devices and is configured to be capable of displaying images such as those of various information (information screen pages) for the in-vehicle devices and the operation screen pages for the in-vehicle devices. According to the first embodiment, the display part 30 includes the two display devices 31 and 32. Information displayed on the display devices 31 and 32, respectively, can be information concerning the common in-vehicle device or respective sets of information concerning different in-vehicle devices. Similarly, the respective operation screen pages displayed on the display devices 31 and 32 can be those concerning the common in-vehicle device or concerning different in-vehicle devices, respectively. The plurality of display devices included in the display part 30 are connected with the control part 20 in a manner capable of performing communication therebetween. The display device as the operation valid display device from among the plurality of display devices included in the display part 30 can transmit an "operation valid signal" to the control part 20. Thereby, the control part 20 can determine which one of the plurality of display devices is the operation valid display device.

Note that the information screen pages and the operation screen pages for the in-vehicle devices displayed on the plurality of display devices included in the display part 30 can be displayed in a superimposing manner on the display devices. For example, an information screen page displaying a map and the position of the vehicle and an operation screen page for performing settings (for example, a setting of magnifying/reducing the size of the map, a setting of the displaying orientation of the map or so) of the car navigation system can be displayed in a superimposing manner on the display device.

Specific examples of mounting the operating switch 10 and the display devices 31 and 32 in a vehicle will be briefly described now.

Figure 2A:
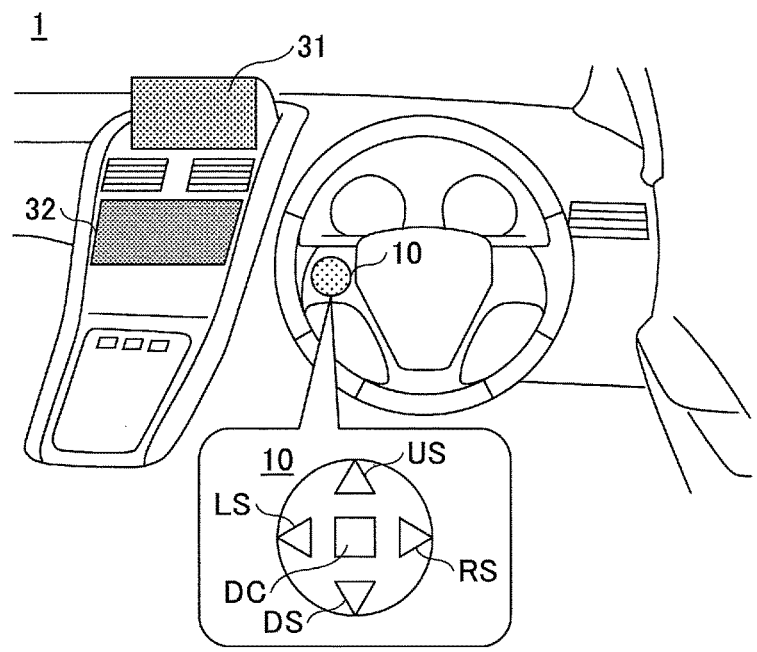
FIGS. 2A and 2B illustrate examples of arranging display devices and an operating switch mounted in a vehicle.
Figure 2B:
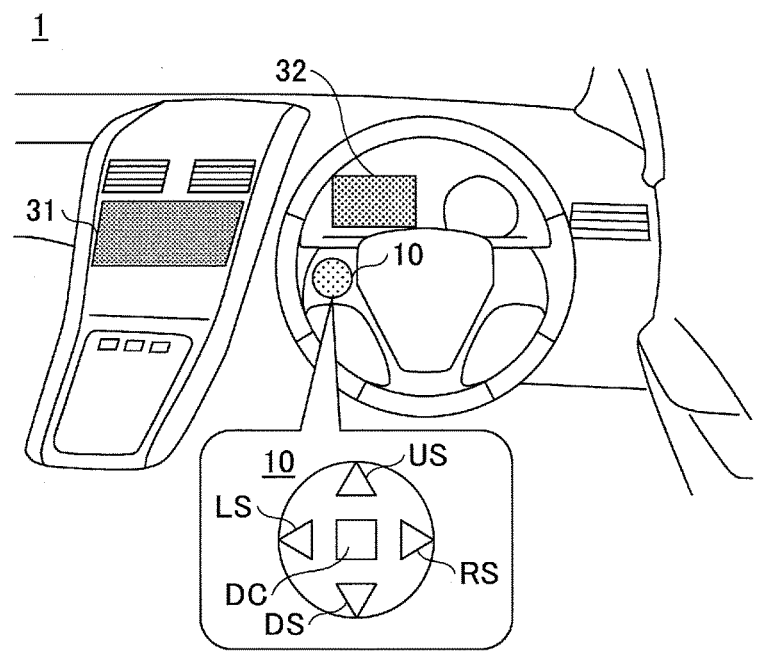

FIGS. 2A and 2B illustrate examples of arranging the display devices 31 and 32 and the operating switch 10 mounted in a vehicle. Each of FIGS. 2A and 2B illustrates a state where the instrument panel at the front side inside the vehicle interior is viewed from the rear side inside the vehicle interior. FIG. 2A illustrates one example of arranging the display devices 31 and 32 and the operating switch 10. FIG. 2B illustrates another example of arranging the display devices 31 and 32 and the operating switch 10.

As shown in FIG. 2A, the display devices 31 and 32 are arranged in a vertical direction at a central part of the instrument panel. The operating switch 10 for performing operations on the operation screen pages of the display devices 31 and 32 is placed on a spoke of the steering wheel. By placing the operating switch 10 on the steering wheel, the driver can perform operations on the operation screen pages of the display devices 31 and 32 without removing his or her hands from the steering wheel. Thus, it is possible to improve the safety, the operability and so forth.

As shown in FIG. 2B, the display device 31 is placed at a central part of the instrument panel and the display device 32 is provided in the meter panel placed in front of the driver's seat. Thus, the display devices 31 and 32 are arranged horizontally, side by side.

Although not shown in FIGS. 2A and 2B, the number of the display devices included in the display part 30 mounted in the vehicle can be more than these two.

Further, as shown in FIGS. 2A and 2B, the operating switch 10 includes a fixing switch DC for fixing the operation menu in the operation screen page and direction instruction switches (i.e., an up switch US, a down switch DS, a left switch LS and a right switch RS) for moving among the plurality of operation menus. As the operating switch 10, it is also possible to employ a joystick, a momentary switch or so for implementing operations of fixing the operation menu and moving among the operation menus. It is also possible to employ a touch panel, a touch pad or so for implementing operations of fixing the operation menu and moving among the operation menus.

Next, a process of changing the operation valid display device in the vehicle information display apparatus 1 (the control part 20) according to the first embodiment will be described.

FIG. 3 is a flowchart illustrating one example of a process of changing the operation valid display device in the vehicle information display apparatus (the control part 20). The process of the flowchart can be executed each time the operation signal corresponding to an operation performed by the driver or so on the operating switch 10 is input to the control part 20.

As shown in FIG. 3, in Step S101, the control part 20 acquires the operation signal from the operating switch 10. Thereby, the control part 20 can determine that the corresponding operation is performed by the driver or so on the operating switch 10.

Next, in Step S102, the control part 20 acquires the operation valid signal from the operating switch 10. Thereby, the control part 20 can determine which one of the plurality of display devices included in the display part 30 is the operation valid display device. As will be described later, the control part 20 determines the operation valid display device. For this purpose, it is also possible that the control part 20 determines the current operation valid display device as a result of, each time of determining the operation valid display device according to an operation performed on the operating switch 10, storing a flag or so concerning which display device is thus determined as the operation valid display device in an internal RAM or so.

Next, in Step S103, the control part 20 determines the operation valid display device from among the plurality of display devices included in the display part 30 based on the thus acquired operation signal and operation valid signal. A specific method of determining the operation valid display device will be described later.

Next, in Step S104, the control part 20 determines whether the operation valid display device should be changed.

That is, the control part 20 determines, according to the current operation valid display device and the operation performed on the operating switch 10, whether the current operation valid display device is different from the operation valid display device newly determined in Step S103.

When the operation valid display device should not be changed (NO in Step S104), in other words, when the current operation valid display device is the same as the newly determined operation valid display device, the current process is finished. Thus, in this case, the operation valid display device is not changed.

When the operation valid display device should be changed (YES in Step S104), in other words, when the current operation valid display device is different from the newly determined operation valid display device, the control part 20 proceeds to Step S105.

In Step S105, the control part 20 outputs a signal to switch the operation valid display device to the display part 30 to thus switch the operation valid display device, and finishes the process.

Thus, the control part 20 determines the operation valid display device according to an operation performed on the operating switch 10. When the operation valid display device should be changed, the control part 20 carries out a process of switching (changing) the operation valid display device.

Details of the method of determining the operation valid display device by the vehicle information display apparatus 1 (the control part 20) according to the first embodiment will be described now. The description will be made assuming that the display part 30 includes the two display devices 31 and 32 shown in FIG. 1 and the operating switch 10 shown in FIGS. 2A and 2B is used to perform an operation to change the operation valid display device. Also, the description will be made assuming that the display device 31 is the current operation valid display device.

When any one of the respective switches (the fixing switch DC, the up switch US, the down switch DS, the left switch LS and the right switch RS) of the operating switch 10 is pressed for a pressing time shorter than or equal to a predetermined time (for example, 1 second) (hereinafter, referred to as a "short press operation"), the control part 20 determines that the new operation valid display device is the display device 31. In other words, the operation valid display device will not be changed, and thus, the operation valid display device will not be switched. Also, the control part 20 executes a normal operation of the operation screen page in response to this short press operation. That is, an operation of the operation screen page in the current operation valid display device (the display device 31) is executed.

In contrast thereto, when any one of the respective switches of the operating switch 10 is pressed for a pressing time longer than the predetermined time (hereinafter, referred to as a "long press operation"), the control part 20 determines that the new operation valid display device is the display device 32. In other words, the operation valid display device will be changed, and thus, the operation valid display device will be switched.

Thus, when a normal operation, i.e., a first operation (short press operation) is performed on the operation switch 10, the control part 20 executes the corresponding normal operation of the operation screen page in the (current) operation valid display device in response to the corresponding operation signal. In contrast thereto, when a second operation (long press operation) is performed on the operation switch 10, the control part 20 changes the operation valid display device. As a result, it is possible to implement changing (switching) the operation valid display device without providing a special operation device for switching the operation valid display device. Also, since it is possible to change the operation valid display device by using the operating switch 10 provided for operating the operation screen page on the plurality of display devices included in the display part 30, the driver or so needs not perform a task of confirming a state at hand when changing the operation valid display device and it is possible to improve the operability. Furthermore, this configuration is advantageous for a case where, due to a restriction concerning hardware or so, installing a changeover switch for switching the operation valid display device is difficult, or so.

Note that the above-mentioned "first operation" and "second operation" are not limited to the above-mentioned combination of a short press operation and a long press operation. For example, it is also possible to determine such an operation that, for example, any switch in the operating switch 10 is pressed once during a predetermined time (hereinafter, referred to as a "one press operation") as the "first operation" and determine such an operation that any switch in the operating switch 10 is pressed twice during the predetermined time (hereinafter, referred to as a "two press operation") as the "second operation". Also, when a joystick, a momentary switch or so is employed instead of the operating switch 10, it is possible to determine such an operation that a state of inclining the switch in a predetermined direction is continued for a time shorter than or equal to a predetermined time as an operation equivalent to a short press operation and determine such an operation that a state of inclining the switch in the predetermined direction is continued for a time longer than the predetermined time as an operation equivalent to a long press operation. Further, it is also possible to determine such an operation that an operation of inclining the switch in a predetermined direction is performed once during a predetermined time as an operation equivalent to the "one press operation" and determine such an operation that an operation of inclining the switch in the predetermined direction is performed twice during the predetermined time as an operation equivalent to the "two press operation". Furthermore, when a touch pad or a touch panel is employed instead of the operating switch 10, it is possible to determine such an operation that touching is performed once during a predetermined time (hereinafter, referred to as a "single touch") as the first operation and determine such an operation that touching is performed twice during the predetermined time (hereinafter, referred to as a "double touch") as the second operation.

Further, although the example has been described where the display part 30 includes the two display devices 31 and 32, the display part 30 can include more than two of the display devices 31 and 32. In this case, it is preferable that, for each of the plurality of display devices included in the display part 30, which one of the others of the plurality of display devices the operation valid display device is to be changed to is previously determined. For example, when the display part 30 includes three display devices by including another display device in addition to the display devices 31 and 32, it is preferable to previously determine that, for example, a change of the operation valid display device is carried out from the display device 31 to the display device 32; from the display device 32 to the other display device; and from the other display device to the display device 31. Thereby, the control part 20 can determine the new operation valid display device as the other display device when the second operation is performed in a state where, for example, the operation valid display device is the display device 32.

Second Embodiment

Next, the second embodiment will be described.

The vehicle information display apparatus 1 in the second embodiment is different from the first embodiment in that, according to the second embodiment, when the second operation (for example, a long press operation) accompanied by an instruction indicating an operation direction is performed and the display device is present adjacently in the operation direction, the operation valid display device is changed. Below, the same reference numerals are given to the same or similar elements as those of the first embodiment and description is made mainly for the different parts.

The configuration and the flowchart for changing the operation valid display device in the vehicle information display apparatus 1 according to the second embodiment are shown in FIGS. 1 and 3 as in the first embodiment. Therefore, the description thereof is omitted.

Next, details of a method of determining the operation valid display device carried out by the vehicle information display apparatus 1 (the control part 20) according to the second embodiment will be described. The description will be made assuming that the display part 30 includes the two display devices 31 and 32 shown in FIG. 1. Also, the description will be made assuming that, in the same manner as the first embodiment, the control part 20 executes an operation of the operation screen page in the (current) operation valid display device according to the corresponding operation signal when the first operation (a short press operation) is performed on the operating switch 10.

Figure 4A:
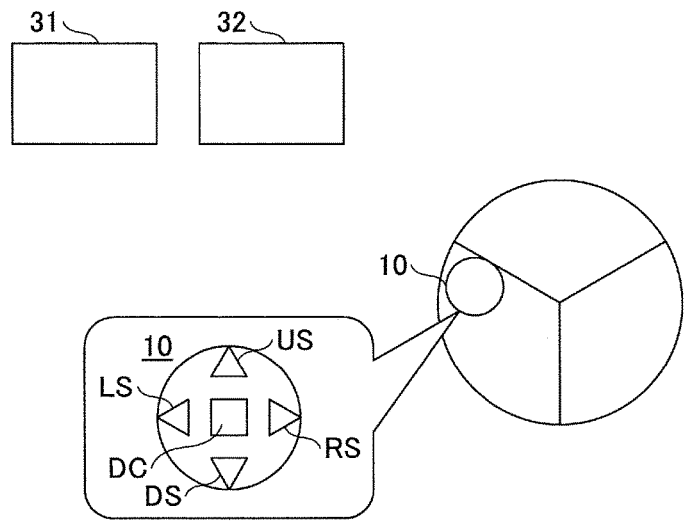
FIGS. 4A and 4B illustrate one example of a method of determining (a method of changing) an operation valid display device in the vehicle information display apparatus (a control part) according to a second embodiment.
Figure 4B:
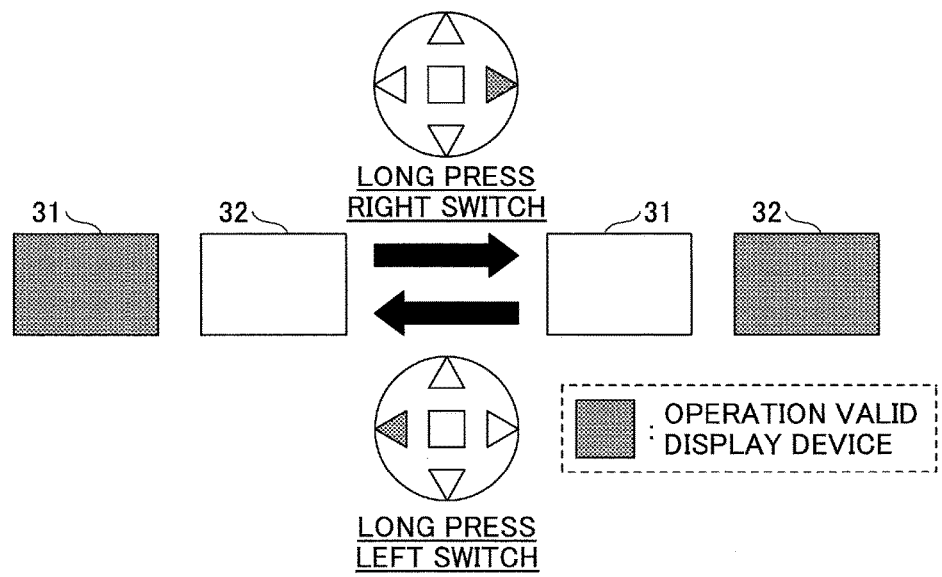

FIGS. 4A and 4B illustrate one example of a method of determining (a method of changing) the operation valid display device in the vehicle information display apparatus 1 (the control part 20) according to the second embodiment. FIG. 4A is a schematic diagram illustrating the arrangement of the display devices 31 and 32 included in the display part 30 in the vehicle. FIG. 4B illustrates a method of changing the operation valid display device assuming the arrangement of the display devices 31 and 32 shown in FIG. 4A.

As shown in FIG. 4A, in this example, in the same way as the above-described FIGS. 2A and 2B, the operating switch 10 includes the fixing switch DC and the direction instruction switches (the up switch US, the down switch DS, the left switch LS and the right switch RS) and is placed on the steering wheel. Further, the display devices 31 and 32 are arranged, side by side, in the direction from the left to the right, in the same manner as FIG. 2B, in the order of the display device 31 and the display device 32.

Assuming the arrangement of the display devices 31 and 32 of FIG. 4A, the control part 20 determines the new operation valid display device (after the change) according to an instruction indicating an operation direction that is input through an operation performed on the operating switch 10 (an operation of the up switch US, the down switch DS, the left switch LS or the right switch RS). Specifically, as shown in FIG. 4B, in a case where the display device 31 is the operation valid display device, when a long press operation is performed on the right switch RS, the control part 20 determines that the new operation valid display device is the display device 32 and changes the operation valid display device into the display device 32. On the other hand, in a case where the display device 32 is the operation valid display device, when a long press operation is performed on the left switch LS, the control part 20 determines that the new operation valid display device is the display device 31 and changes the operation valid display device into the display device 31. That is, the control part 20 changes the operation valid display device into the display device adjacent in the operation direction, when the second operation (a long press operation) is performed on the operating switch 10 and the display device included in the display part 30 is present in the operation direction indicated by the second operation. Thus, as in the first embodiment, it is possible to implement changing (switching) the operation valid display device without providing a special operation device for switching the operation valid display device. Thus, it is possible to improve the operability. Further, since a change of the operation valid display device is carried out in such a way of associating the arrangement of the display devices with an instruction indicating the operation direction, it is possible that an operator (driver or so) intuitively performs an operation. Thus, it is possible to further improve the operability.

In FIGS. 4A and 4B, the example where the display devices 31 and 32 are arranged, side by side, horizontally, has been described. However, a similar process of changing the operation valid display device can be carried out also for an example where the display devices 31 and 32 are arranged vertically.

Figure 5A:
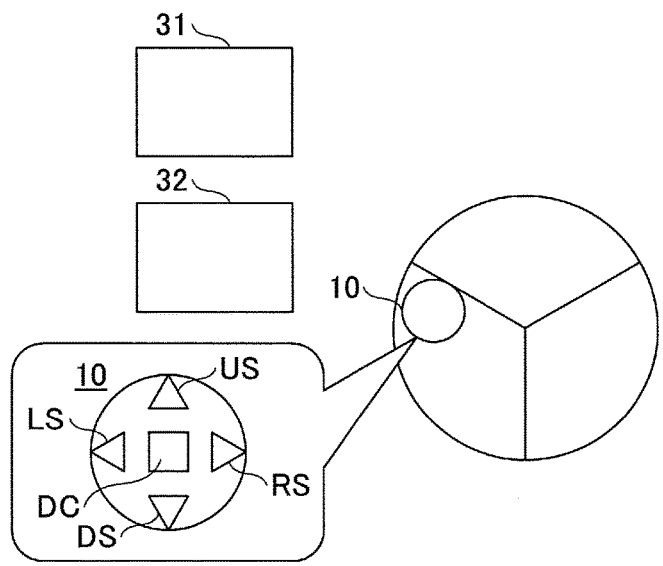
FIGS. 5A and 5B illustrate another example of a method of determining (a method of changing) an operation valid display device in the vehicle information display apparatus (a control part) according to the second embodiment.
Figure 5B:
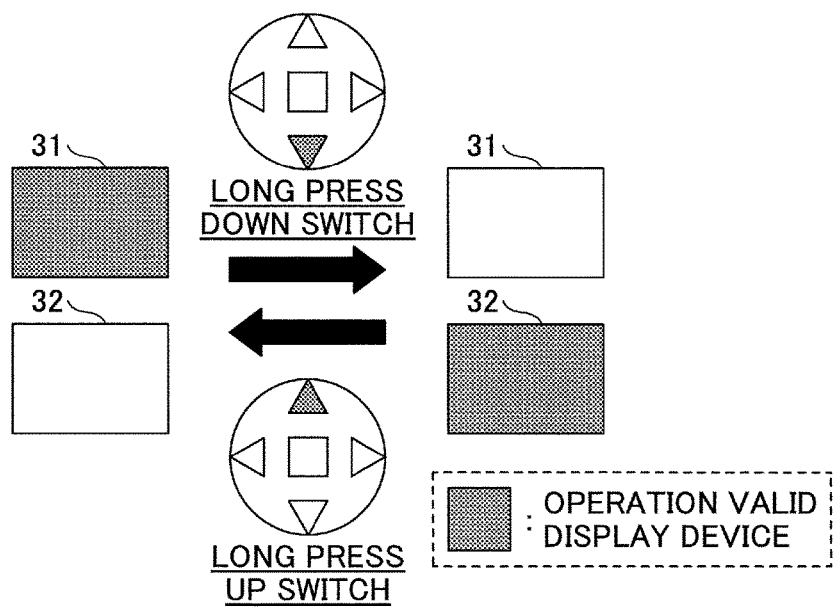

FIGS. 5A and 5B illustrate another example of a method of determining (a method of changing) the operation valid display device in the vehicle information display apparatus 1 (the control part 20) according to the second embodiment. FIG. 5A is a schematic diagram illustrating the arrangement of the display devices 31 and 32 included in the display part 30 in the vehicle. FIG. 5B illustrates a method of changing the operation valid display device assuming the arrangement of the display devices 31 and 32 shown in FIG. 5A.

As shown in FIG. 5A, in this example, in the same way as the above-described FIGS. 2A and 2B, the operating switch 10 includes the fixing switch DC and the direction instruction switches (the up switch US, the down switch DS, the left switch LS and the right switch RS) and is placed on the steering wheel. Further, the display devices 31 and 32 are arranged in the direction from the top to the bottom, in the same manner as FIG. 2A, in the order of the display device 31 and the display device 32.

Assuming the arrangement of the display devices 31 and 32 of FIG. 5A, the control part 20 determines the new operation valid display device (after the change) according to an instruction indicating an operation direction that is input through an operation performed on the operating switch 10 (an operation of the up switch US, the down switch DS, the left switch LS or the right switch RS). Specifically, as shown in FIG. 5B, in a case where the display device 31 is the operation valid display device, when a long press operation is performed on the down switch DS, the control part 20 determines that the new operation valid display device is the display device 32 and changes the operation valid display device into the display device 32. On the other hand in a case where the display device 32 is the operation valid display device, when a long press operation is performed on the up switch US, the control part 20 determines that the new operation valid display device is the display device 31 and changes the operation valid display device into the display device 31. That is, the control part 20 changes the operation valid display device into the display device adjacent in the operation direction, when the second operation (a long press operation) is performed on the operating switch 10 and the display device included in the display part 30 is present in the operation direction indicated by the second operation. Thereby, the same advantageous effect as in the example of FIGS. 4A and 4B can be acquired.

Further, a similar process of changing the operation valid display device can be carried out also for an example where three or more of the display devices are included in the display part 30 and the display devices are arranged in a plurality of directions. Below, description will be made for an example where the display part 30 includes four display devices 31, 32, 33 and 34.

Figure 6A:
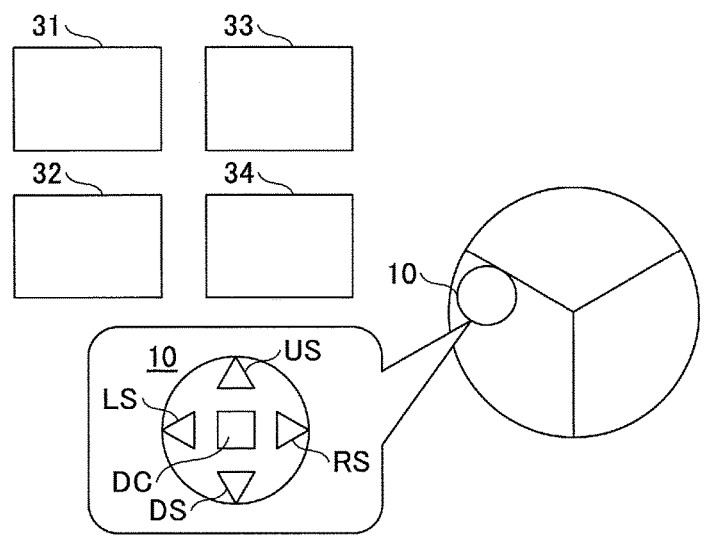
FIGS. 6A and 6B illustrate yet another example of a method of determining (a method of changing) an operation valid display device in the vehicle information display apparatus (a control part) according to the second embodiment.
Figure 6B:
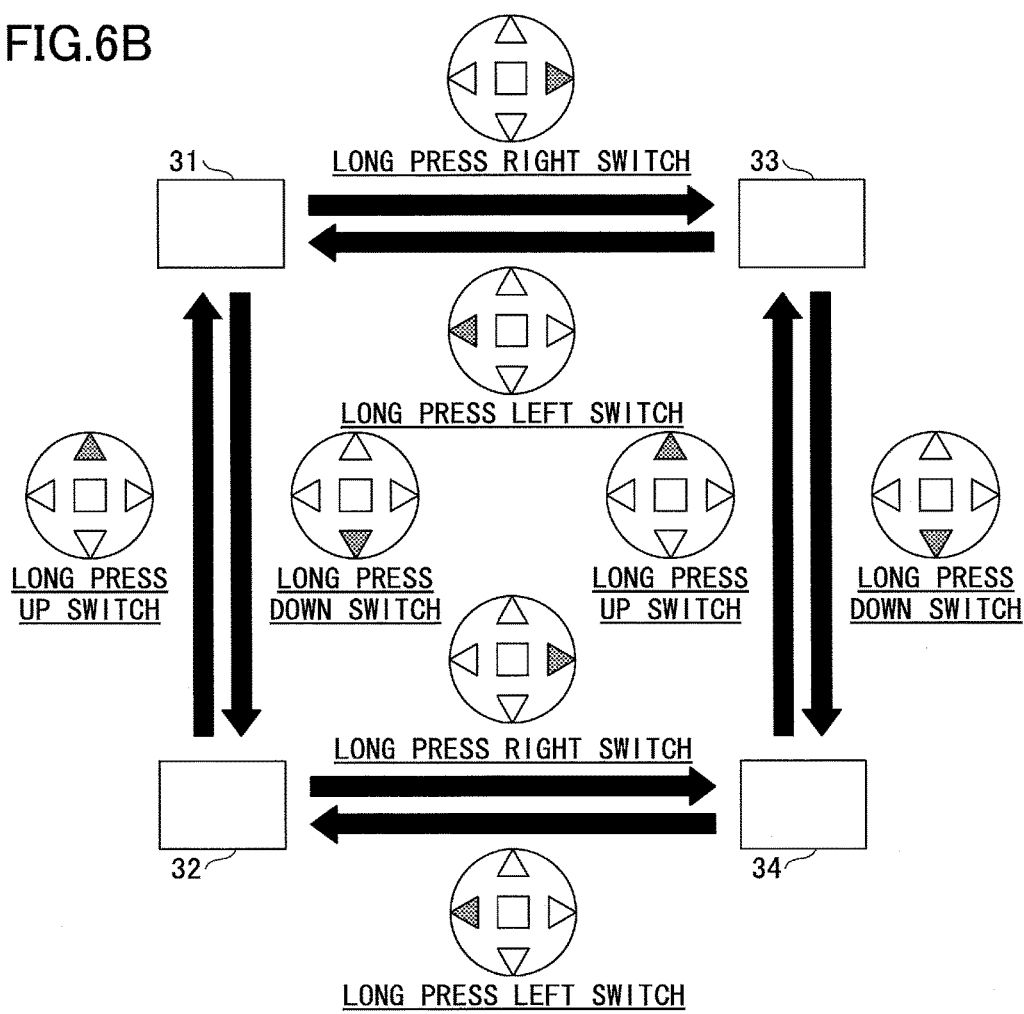

FIGS. 6A and 6B illustrate yet another example of a method of determining (a method of changing) the operation valid display device in the vehicle information display apparatus 1 (the control part 20) according to the second embodiment. FIG. 6A is a schematic diagram illustrating the arrangement of the display devices 31-34 included in the display part 30 in the vehicle. FIG. 6B illustrates a method of changing the operation valid display device assuming the arrangement of the display devices 31-34 shown in FIG. 6A.

As shown in FIG. 6A, in this example, in the same way as the above-described FIGS. 2A and 2B, the operating switch 10 includes the fixing switch DC and the direction instruction switches (the up switch US, the down switch DS, the left switch LS and the right switch RS) and is placed on the steering wheel. Further, the display devices 31-34 are arranged vertically and horizontally in two rows, respectively. Specifically, vertically from the top, the display device 31 and the display device 32 are arranged in the stated order. To the right thereof in parallel, vertically from the top, the display device 33 and the display device 34 are arranged in the stated order. In other words, horizontally from the left, the display device 31 and the display device 33 are arranged in the stated order. Below thereof in parallel, horizontally from the left, the display device 32 and the display device 34 are arranged in the stated order.

Assuming the arrangement of the display devices 31-34 of FIG. 6A, the control part 20 determines the new operation valid display device (after the change) according to an instruction indicating an operation direction that is input through an operation performed on the operating switch 10 (an operation of the up switch US, the down switch DS, the left switch LS or the right switch RS). Specifically, as shown in FIG. 6B, in a case where the display device 31 is the operation valid display device, when a long press operation is performed on the down switch DS, the control part 20 determines that the new operation valid display device is the display device 32 adjacent in the downward direction and changes the operation valid display device into the display device 32. On the other hand, when a long press operation is performed on the right switch RS, the control part 20 determines that the new operation valid display device is the display device 33 adjacent in the rightward direction and changes the operation valid display device into the display device 33. Further, in a case where the display device 32 is the operation valid display device, when a long press operation is performed on the up switch US, the control part 20 determines that the new operation valid display device is the display device 31 adjacent in the upward direction and changes the operation valid display device into the display device 31. When a long press operation is performed on the right switch RS, the control part 20 determines that the new operation valid display device is the display device 34 adjacent in the rightward direction and changes the operation valid display device into the display device 34. In a case where the display device 33 is the operation valid display device, when a long press operation is performed on the left switch LS, the control part 20 determines that the new operation valid display device is the display device 31 adjacent in the leftward direction and changes the operation valid display device into the display device 31. On the other hand, when a long press operation is performed on the down switch DS, the control part 20 determines that the new operation valid display device is the display device 34 adjacent in the downward direction and changes the operation valid display device into the display device 34. Further, in a case where the display device 34 is the operation valid display device, when a long press operation is performed on the left switch LS, the control part 20 determines that the new operation valid display device is the display device 32 adjacent in the leftward direction and changes the operation valid display device into the display device 32. When a long press operation is performed on the up switch US, the control part 20 determines that the new operation valid display device is the display device 33 adjacent in the upward direction and changes the operation valid display device into the display device 33. That is, the control part 20 changes the operation valid display device into the display device adjacent in the operation direction when the second operation (a long press operation) is performed on the operating switch 10 and the display device included in the display part 30 is present in the operation direction indicated by the second operation. Thereby, the same advantageous effect as in the examples of FIGS. 4A and 4B and FIGS. 5A and 5B can be acquired.

In the examples of FIGS. 4A and 4B, FIGS. 5A and 5B and FIGS. 6A and 6B, it is possible that the control part 20 carries out a process in an arbitrary manner for a case where when the second operation is performed on the operating switch 10, no display device included in the display part 30 is present in the operation direction indicated by the second operation. For example, it is possible that the control part 20 changes the operation valid display device according to the operation signal corresponding to the second operation; it is possible that the control part 20 executes an operation of the operation screen page in the (current) operation valid display device; or it is possible that the control part 20 ignores this second operation.

Also in the same manner as in the first embodiment, the "first operation" and the "second operation" are not limited to the above-mentioned combination of a short press operation and a long press operation. For example, it is also possible to determine a "one press operation", mentioned above, as the "first operation" and determine a "two press operation", mentioned above, as the "second operation". Also, when a joystick, a momentary switch or so is employed instead of the operating switch 10, it is possible to determine such an operation that a state of inclining the switch in a predetermined direction is continued for a time shorter than or equal to a predetermined time as an operation equivalent to a short press operation and determine such an operation that a state of inclining the switch in the predetermined direction is continued for a time longer than the predetermined time as an operation equivalent to a long press operation. Further, it is also possible to determine such an operation that an operation of inclining the switch in a predetermined direction is performed once during a predetermined time as an operation equivalent to the "one press operation" and determine such an operation that an operation of inclining the switch in the predetermined direction is performed twice during the predetermined time as an operation equivalent to the "two press operation". Furthermore, when a touch pad or a touch panel is employed instead of the operating switch 10, it is possible to determine a "single touch" as the first operation and determine a "double touch" as the second operation. Furthermore, an instruction indicating an operation direction such as those mentioned above can be input also by a touch operation performed on the touch pad or the touch panel in such a manner of flicking the touch pad or the touch panel in the operation direction (a so-called "flick operation").

Further, in the examples of FIGS. 4A and 4B, FIGS. 5A and 5B and FIGS. 6A and 6B, the display devices 31 and 32 and those 31-34 are regularly arranged vertically and/or horizontally. However, actually in a vehicle, there can be a case where such a regular arrangement of the display devices cannot be available due to a certain restriction. For example, even when the display devices 31 and 32 are arranged horizontally, the display devices 31 and 32 can be placed at positions somewhat different in the vertical direction. It is preferable that the above-mentioned process of changing the operation valid display device can be applied also in such a case. For this purpose, it is preferable that when the display device included in the display part 30 is present in a direction within a predetermined range from the operation direction indicated by the second operation, the control part 20 changes the operation valid display device into the display device adjacent in the direction within the predetermined range from the operation direction. This predetermined range can be appropriately determined depending on the actual positions of the plurality of display devices included in the display part 30 in the vehicle.

Third Embodiment

Next, the third embodiment will be described.

The vehicle information display apparatus 1 in the third embodiment is different from the first embodiment in that, according to the third embodiment, when the second operation (for example, a long press operation) accompanied by an instruction indicating an operation direction is performed and no operation menu is present in the operation direction in the operation valid display device, the operation valid display device is changed. Below, the same reference numerals are given to the same or similar elements as those of the first embodiment and description is made mainly for the different parts.

The configuration and the flowchart for changing the operation valid display device in the vehicle information display apparatus 1 according to the third embodiment are shown in FIGS. 1 and 3 as in the first embodiment. Therefore, the description thereof is omitted.

Next, details of a method of determining (a method of changing) the operation valid display device carried out by the vehicle information display apparatus 1 (the control part 20) according to the third embodiment will be described. The description will be made assuming that the display part 30 includes the two display devices 31 and 32 shown in FIG. 1. Also, the description will be made assuming that, in the same manner as the first embodiment, the control part 20 executes an operation of the operation screen page in the (current) operation valid display device according to the corresponding operation signal when the first operation (a short press operation) is performed on the operating switch 10.

Figure 7A:
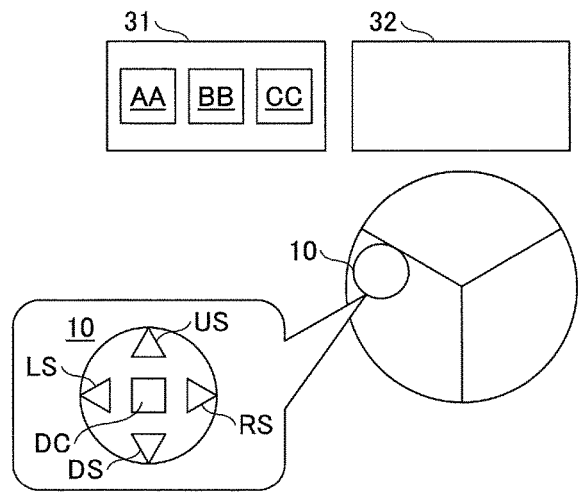
FIGS. 7A and 7B illustrate one example of a method of determining (a method of changing) an operation valid display device in the vehicle information display apparatus (a control part) according to a third embodiment.
Figure 7B:
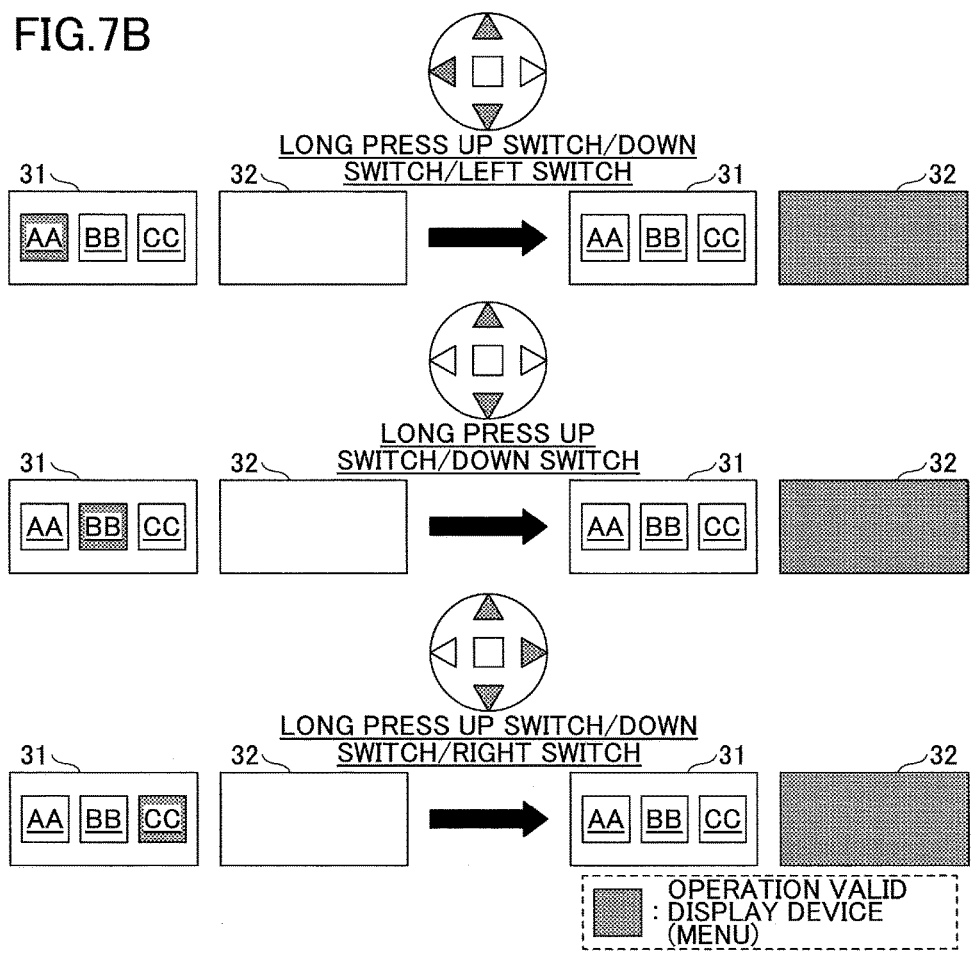

FIGS. 7A and 7B illustrate one example of a method of determining (a method of changing) the operation valid display device in the vehicle information display apparatus 1 (the control part 20) according to the third embodiment. FIG. 7A is a schematic diagram illustrating the arrangement of the display devices 31 and 32 included in the display part 30 in the vehicle and the operation screen page. FIG. 7B illustrates a method of changing the operation valid display device assuming the arrangement of the display devices 31 and 32 and the operation screen page shown in FIG. 7A.

As shown in FIG. 7A, in this example, in the same way as the above-described FIGS. 2A and 2B, the operating switch 10 includes the fixing switch DC and the direction instruction switches (the up switch US, the down switch DS, the left switch LS and the right switch RS) and is placed on the steering wheel. Further, the display devices 31 and 32 are arranged, side by side, horizontally from the left, in the same manner as FIG. 2B, in the order of the display device 31 and the display device 32. Further, on the display device 31, the operation screen page is displayed, and, in the operation screen page, the operation menus AA, BB and CC as operation targets are arranged in the stated order in the direction from the left to the right. The operation menus AA, BB and CC can be any operation menus such as a selection menu as to which one of the information screen pages for the in-vehicle devices should be displayed, a source selection menu for the audio system (i.e., a menu for selecting a source from among a radio, a CD, a DVD and so forth) and so forth. The specific way of arranging the operation menus and so forth in the operation screen page on the display devices 31 and 32 can be determined freely.

Assuming the arrangement of the display devices 31 and 32 and the operation screen page of FIG. 7A, the control part 20 determines the new operation valid display device (after the change) according to an instruction indicating an operation direction that is input through an operation performed on the operating switch 10 (an operation of the up switch US, the down switch DS, the left switch LS or the right switch RS). Specifically, as shown in FIG. 7B, in a state where the display device 31 is the operation valid display device and the operation menu AA is selected, when the up switch US, the down switch DS or the left switch LS is operated in a manner of a "long press operation" (the second operation), the control part 20 changes the operation valid display device into the display device 32. In a state where the display device 31 is the operation valid display device and the operation menu BB is selected, when the up switch US or the down switch DS is operated in a manner of a "long press operation" (the second operation), the control part 20 changes the operation valid display device into the display device 32. In a state where the display device 31 is the operation valid display device and the operation menu CC is selected, when the up switch US, the down switch DS or the right switch RS is operated in a manner of a "long press operation" (the second operation), the control part 20 changes the operation valid display device into the display device 32. That is, when the second operation is performed and no operation menu is present in the operation direction indicated by the second operation, the control part 20 changes the operation valid display device based on the operation signal corresponding to the second operation. Thus, it is possible to acquire the advantageous effects same as those in the first embodiment.

Further, in the manner as this example, also for a case where the display device 32 is the operation valid display device, the same or similar method of changing the operation valid display device can be applied according to the relationship with the operation menus in the operation screen page in the display device 32. Further, also for a case where the display devices 31 and 32 are arranged vertically, a method of changing the operation valid display device which is the same as or similar to that in this example can be applied.

Further, also for a case where the number of the display devices included in the display part 30 is three or more, the same or similar method of changing the operation valid display device can be applied. In this case, the plurality of display devices are candidates for the operation valid display device after the change. Therefore, it is preferable that, for each of the plurality of display devices included in the display part 30, which one of the others of the plurality of display devices the operation valid display device is to be changed to is previously determined, for example. Further, it is also possible that the control part 20 determines the operation valid display device according to the operation direction indicated by the second operation. Specifically, a case will be assumed where the display part 30 includes, in addition to the display devices 31 and 32, another display device, the other display device, the display device 31 and the display device 32 are arranged in the stated order in the direction from the left to the right, and the display device 31 is the operation valid display device. In this case, it is possible that, when the left switch LS is operated in a manner of a "long press operation" (the second operation) in a state where the operation menu AA is selected, the control part 20 determines that the new operation valid display device is the other display device adjacent in the leftward direction and changes the operation valid display device to the other display device. Also, it is possible that, when the right switch RS is operated in a manner of a "long press operation" (the second operation) in a state where the operation menu CC is selected, the control part 20 determines that the new operation valid display device is the display device 32 adjacent in the rightward direction and changes the operation valid display device to the display device 32. Thereby, the operation direction indicated by the second operation becomes approximately the same as the direction of the changed operation valid display device from the current operation valid display device. Thus, it is possible that an operator (driver or so) intuitively performs an operation. Thus, it is possible to further improve the operability. It is possible that, when a long press operation is performed in a direction in which no adjacent display device is present, the control part 20 changes the operation valid display device to the display device which is the above-mentioned previously determined one to which the operation valid display device is to be changed.

When the second operation is performed and the operation menu is present in the operation direction indicated by the second operation in the operation valid display device, the control part 20 changes the selection of the operation menu based on the operation signal corresponding to the second operation accordingly. That is, the control part 20 changes the current state into the state where the operation menu adjacent in the operation direction is selected.

Also in the same manner as in the first and second embodiments, the "first operation" and the "second operation" are not limited to the above-mentioned combination of a short press operation and a long press operation. For example, it is also possible to determine a "one press operation" as the "first operation" and determine a "two press operation" as the "second operation". Also, when a joystick, a momentary switch or so is employed instead of the operating switch 10, it is possible to determine such an operation that a state of inclining the switch in a predetermined direction is continued for a time shorter than or equal to a predetermined time as an operation equivalent to a short press operation and determine such an operation that a state of inclining the switch in the predetermined direction is continued for a time longer than the predetermined time as an operation equivalent to a long press operation. Further, it is also possible to determine such an operation that an operation of inclining the switch in a predetermined direction is performed once during a predetermined time as an operation equivalent to the "one press operation" and determine such an operation that an operation of inclining the switch in the predetermined direction is performed twice during the predetermined time as an operation equivalent to the "two press operation". Furthermore, when a touch pad or a touch panel is employed instead of the operating switch 10, it is possible to determine a "single touch" as the first operation and determine a "double touch" as the second operation. Furthermore, an instruction indicating an operation direction such as those mentioned above can be input also by a touch operation performed on the touch pad or the touch panel in such a manner of flicking the touch pad or the touch panel in the operation direction (a so-called "flick operation").

Fourth Embodiment

Next, the fourth embodiment will be described.

The vehicle information display apparatus 1 in the fourth embodiment is different from the first embodiment in that, according to the fourth embodiment, the operation menus in the operation screen page are arranged over the plurality of display devices in a predetermined direction. Also, the vehicle information display apparatus 1 in the fourth embodiment is different from the first embodiment in that, according to the fourth embodiment, when the second operation is performed to indicate the operation direction in the predetermined direction in which the operation menus are arranged or the opposite direction and no operation menu is present in the operation direction in the operation valid display device, the operation valid display device is changed. Below, the same reference numerals are given to the same or similar elements as those of the first embodiment and description will be made mainly for the different parts.

The configuration and the flowchart for changing the operation valid display device in the vehicle information display apparatus 1 according to the fourth embodiment are shown in FIGS. 1 and 3 as in the first embodiment. Therefore, the description thereof is omitted.

Next, details of a method of determining (a method of changing) the operation valid display device carried out by the vehicle information display apparatus 1 (the control part 20) according to the fourth embodiment will be described.

Figure 8A:
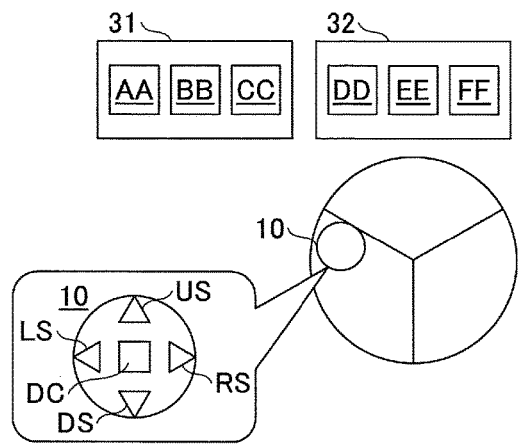
FIGS. 8A, 8B and 8C illustrate one example of a method of determining (a method of changing) an operation valid display device in the vehicle information display apparatus (a control part) according to a fourth embodiment.
Figure 8B:
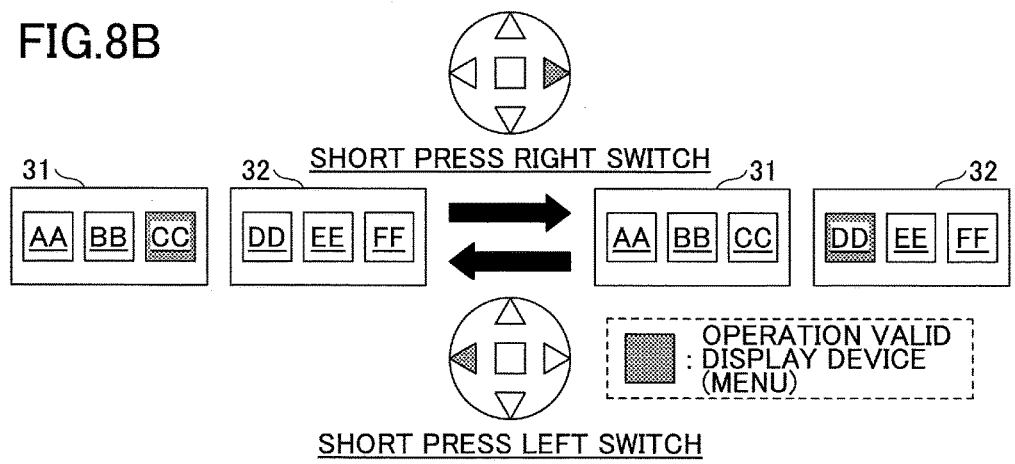
Figure 8C:
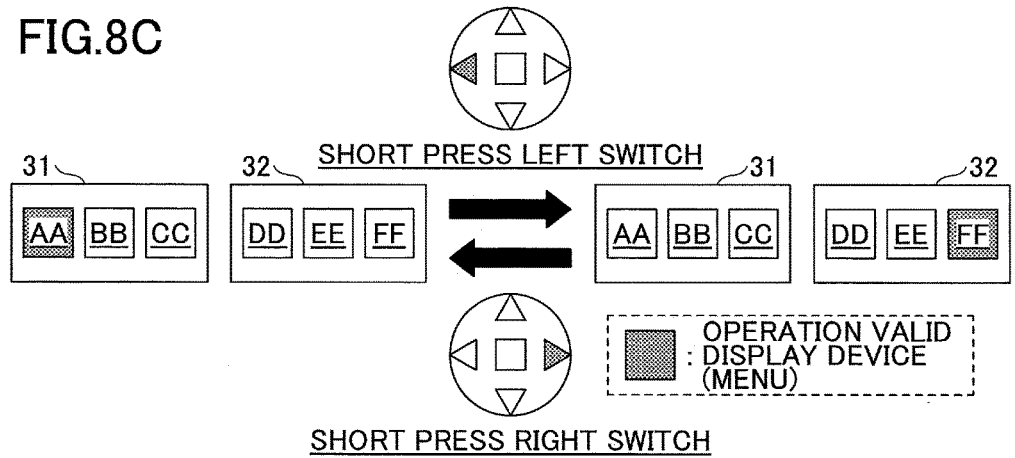

FIGS. 8A-8C illustrate one example of a method of determining (a method of changing) the operation valid display device in the vehicle information display apparatus 1 (the control part 20) according to the fourth embodiment. FIG. 8A is a schematic diagram illustrating the arrangement of the display devices 31 and 32 included in the display part 30 in the vehicle and the operation screen pages. FIGS. 8B and 8C illustrate methods of changing the operation valid display device assuming the arrangement of the display devices 31 and 32 and the operation screen pages shown in FIG. 8A.

As shown in FIG. 8A, in this example, in the same way as the above-described FIGS. 2A and 2B, the operating switch 10 includes the fixing switch DC and the direction instruction switches (the up switch US, the down switch DS, the left switch LS and the right switch RS) and is placed on the steering wheel. Further, the display devices 31 and 32 are arranged, side by side, in the direction from the left to the right, in the same manner as FIG. 2B, in the order of the display device 31 and the display device 32. Further, on the display devices 31 and 32, the operation screen pages are displayed, and, in the operation screen pages, the operation menus AA, BB, CC, DD, EE and FF as operation targets are arranged in the stated order in the direction from the left to the right over the display devices 31 and 32. From among the operation menus AA, BB, CC, DD, EE and FF arranged over the display devices 31 and 32, the operation menus AA, BB and CC are displayed in the operation screen page of the display device 31 while the operation menus DD, EE and FF are displayed in the operation screen page of the display device 32. The operation menus AA, BB, CC, DD, EE and FF can be any operation menus such as a selection menu as to which one of the information screen pages for the in-vehicle devices should be displayed, a source selection menu for the audio system (i.e., a menu for selecting a source from among a radio, a CD, a DVD and so forth) and so forth.

Assuming the arrangement of the display devices 31 and 32 and the operation screen pages of FIG. 8A, the control part 20 determines the new operation valid display device (after the change) according to an instruction indicating an operation direction that is input through an operation performed on the operating switch 10 (an operation of the left switch LS or the right switch RS). Specifically, as shown in FIG. 8B, in a state where the display device 31 is the operation valid display device and the operation menu CC is selected, when the right switch RS is operated in a manner of a "short press operation", the control part 20 changes the operation valid display device into the display device 32 and brings the state where the operation menu DD is selected. In a state where the display device 32 is the operation valid display device and the operation menu DD is selected, when the left switch LS is operated in a manner of a "short press operation", the control part 20 changes the operation valid display device into the display device 31 and brings the state where the operation menu CC is selected. That is, the control part 20 changes the operation valid display device when an operation is performed on the operating switch 10 accompanied by the instruction to indicate the operation direction in the rightward direction same as the direction in which the operation menus are arranged or the opposite direction (leftward direction) and no operation menu is present in the operation direction in the operation valid display device. Further, in this change in the operation valid display device, the control part 20 determines the display device that displays the operation menu adjacent in the operation direction in the arrangement of operation menus as the new operation valid display device. Thereby, it is possible to acquire the advantageous effects same as those in the first embodiment. Further, since the operation valid display device is changed in a manner of being associated with the continuity of the arrangement of the operation menus, it is possible that an operator (driver or so) intuitively performs an operation. Thus, it is possible to further improve the operability.

Further, each of the first operation menu and the last operation menu in the arrangement of the operation menus has its adjacent operation menu only in a single direction, i.e., the rightward direction or the leftward direction. Therefore, it is also possible that the control part 20 can switch the selection state of the operation menu in response to the operation direction being indicated by the instruction in the direction in which no operation menu is adjacently present in either case. Specifically, as shown in FIG. 8C, in a state where the display device 31 is the operation valid display device and the operation menu AA is selected, when the left switch LS is operated in a manner of a "short press operation", the control part 20 changes the operation valid display device into the display device 32 and brings the state where the operation menu FF is selected. Also, in a state where the display device 32 is the operation valid display device and the operation menu FF is selected, when the right switch RS is operated in a manner of a "short press operation", the control part 20 changes the operation valid display device into the display device 31 and brings the state where the operation menu AA is selected. That is, it is possible that the control part 20 changes the operation valid display device when no adjacent operation menu is present in the operation direction indicated by the instruction of an operation performed on the operating switch 10 in the operation valid display device and also no adjacent operation menu is present in the operation direction with respect to the currently selected operation menu in the arrangement of the operation menus. Further, in this change in the operation valid display device, the control part 20 determines the display device that displays the operation menu having no adjacent operation menu in the direction opposite to the operation direction in the arrangement of operation menus as the new operation valid display device. Thereby, it is possible to acquire the advantageous effects same as those in the example shown in FIG. 8B.

Although the description has been made using FIGS. 8A-8C for the example where the display devices 31 and 32 and the operation menus are arranged horizontally, the same process of changing the operation valid display device can be executed also for a case where the display devices 31 and 32 and the operation menus are arranged vertically.

Figure 9A:
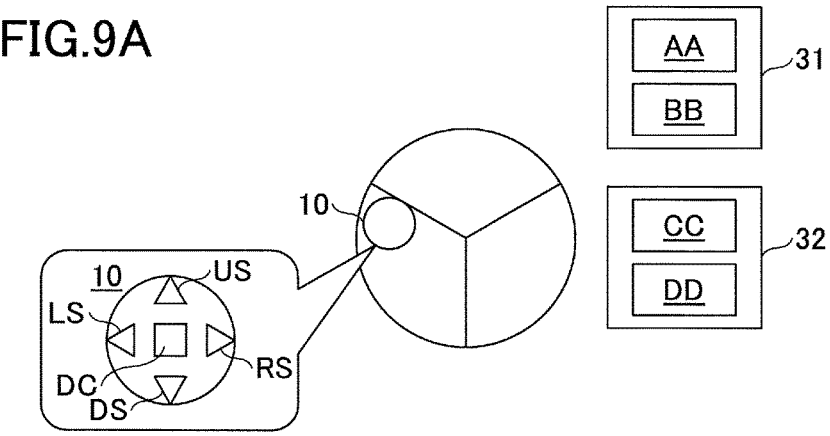
FIGS. 9A, 9B and 9C illustrate another example of a method of determining (a method of changing) an operation valid display device in the vehicle information display apparatus (a control part) according to the fourth embodiment.
Figure 9B:
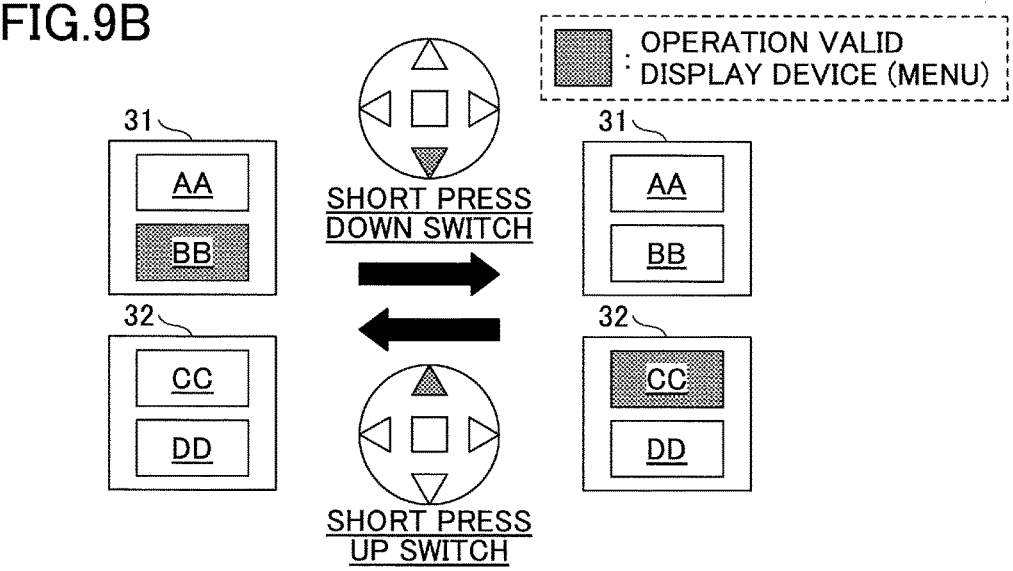
Figure 9C:
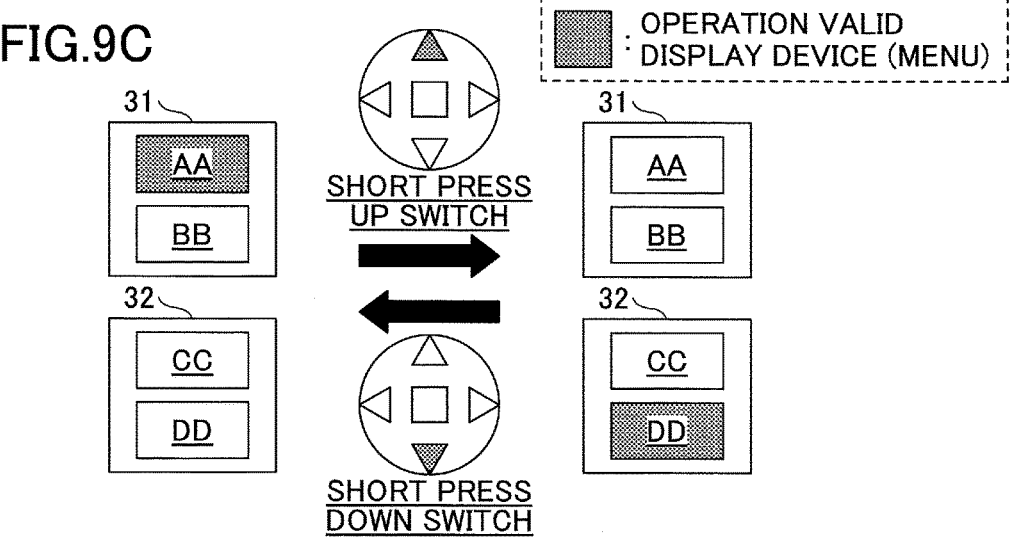

FIGS. 9A-9C illustrate one example of a method of determining (a method of changing) the operation valid display device in the vehicle information display apparatus 1 (the control part 20) according to the fourth embodiment. FIG. 9A is a schematic diagram illustrating the arrangement of the display devices 31 and 32 included in the display part 30 in the vehicle and the operation screen pages. FIGS. 9B and 9C illustrate methods of changing the operation valid display device assuming the arrangement of the display devices 31 and 32 and the operation screen pages shown in FIG. 9A.

As shown in FIG. 9A, in this example, in the same way as the above-described FIGS. 2A and 2B, the operating switch 10 includes the fixing switch DC and the direction instruction switches (the up switch US, the down switch DS, the left switch LS and the right switch RS) and is placed on the steering wheel. Further, the display devices 31 and 32 are arranged in the direction from the top to the bottom in the same manner as FIG. 2A, in the order of the display device 31 and the display device 32. Further, on the display devices 31 and 32, the operation screen pages are displayed, and, in the operation screen pages, the operation menus AA, BB, CC and DD as operation targets are arranged in the stated order in the direction from the top to the bottom over the display devices 31 and 32. From among the operation menus AA, BB, CC and DD, arranged over the display devices 31 and 32, the operation menu AA and BB are displayed in the operation screen page of the display device 31 while the operation menu CC and DD are displayed in the operation screen page of the display device 32. The operation menus AA, BB, CC and DD can be any operation menus such as a selection menu as to which one of the information screen pages for the in-vehicle devices should be displayed, a source selection menu for the audio system (i.e., a menu for selecting a source from among a radio, a CD, a DVD and so forth) and so forth.

Assuming the arrangement of the display devices 31 and 32 and the operation screen pages of FIG. 9A, the control part 20 determines the new operation valid display device (after the change) according to an instruction indicating an operation direction that is input through an operation performed on the operating switch 10 (an operation of the up switch US or the down switch DS). Specifically, as shown in FIG. 9B, in a state where the display device 31 is the operation valid display device and the operation menu BB is selected, when the down switch DS is operated in a manner of a "short press operation", the control part 20 changes the operation valid display device into the display device 32 and brings the state where the operation menu CC is selected. In a state where the display device 32 is the operation valid display device and the operation menu CC is selected, when the up switch US is operated in a manner of a "short press operation", the control part 20 changes the operation valid display device into the display device 31 and brings the state where the operation menu BB is selected. That is, the control part 20 changes the operation valid display device when an operation is performed on the operating switch 10 accompanied by the instruction to indicate the operation direction in the downward direction same as the direction in which the operation menus are arranged or the opposite direction (upward direction) and no operation menu is present in the operation direction in the operation valid display device. Further, in this change in the operation valid display device, the control part 20 determines the display device that displays the operation menu adjacent in the operation direction in the arrangement of operation menus as the new operation valid display device. Thereby, it is possible to acquire the advantageous effects same as those in the example of FIG. 8B.

As shown in FIG. 9C, in a state where the display device 31 is the operation valid display device and the operation menu AA is selected, when the up switch US is operated in a manner of a "short press operation", the control part 20 changes the operation valid display device into the display device 32 and brings the state where the operation menu DD is selected. In a state where the display device 32 is the operation valid display device and the operation menu DD is selected, when the down switch DS is operated in a manner of a "short press operation", the control part 20 changes the operation valid display device into the display device 31 and brings the state where the operation menu AA is selected. That is, it is possible that the control part 20 changes the operation valid display device when no adjacent operation menu is present in the operation direction indicated by the instruction of an operation performed on the operating switch 10 in the operation valid display device and also no adjacent operation menu is present in the operation direction with respect to the currently selected operation menu in the arrangement of the operation menus. Further, in this change in the operation valid display device, the control part 20 determines the display device that displays the operation menu having no adjacent operation menu in the direction opposite to the operation direction in the arrangement of operation menus as the new operation valid display device. Thereby, it is possible to acquire the advantageous effects same as those in the example of FIG. 8C.

Further, the same or similar process of changing the operation valid display device can be applied to a case where three or more display devices are included in the display part 30 and the operation menus are arranged over three or more display devices. Below, description will be made of an example where three display devices 31, 32 and 33 are included in the display part 30.

Figure 10A:
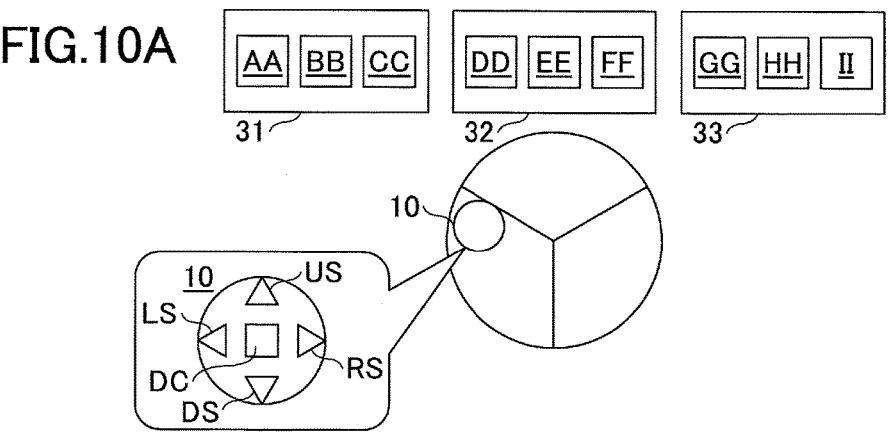
FIGS. 10A, 10B and 10C illustrate yet another example of a method of determining (a method of changing) an operation valid display device in the vehicle information display apparatus (a control part) according to the fourth embodiment.
Figure 10B:
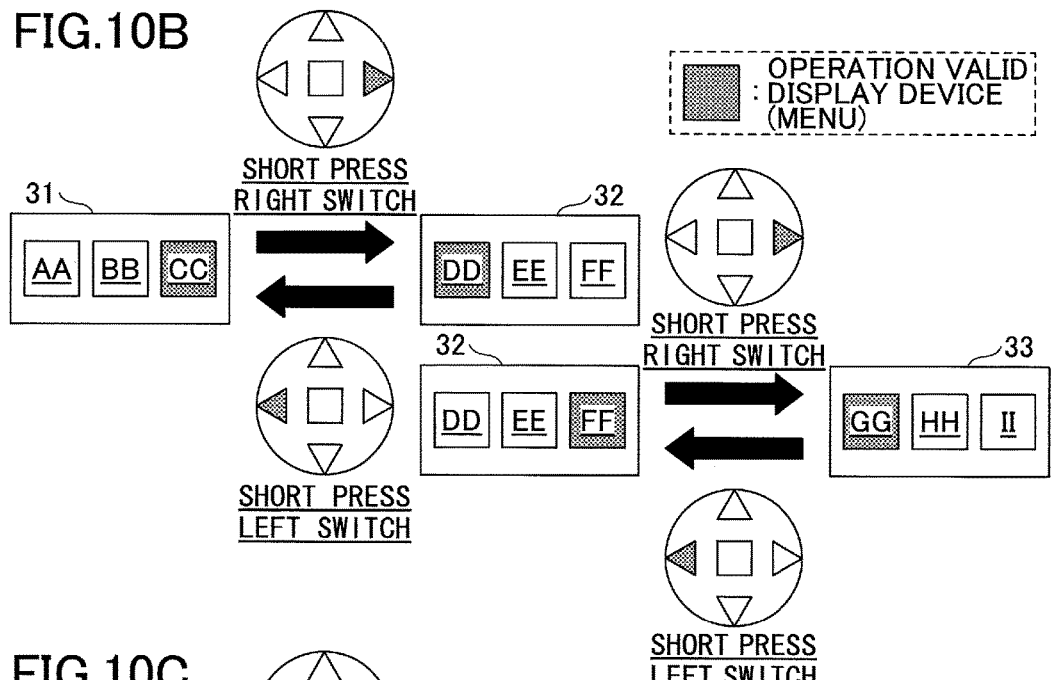
Figure 10C:
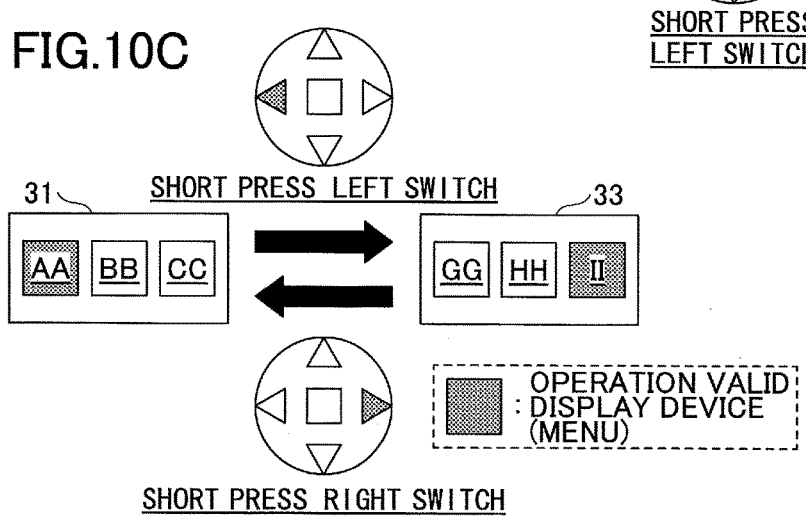

FIGS. 10A-10C illustrate one example of a method of determining (a method of changing) the operation valid display device in the vehicle information display apparatus 1 (the control part 20) according to the fourth embodiment. FIG. 10A is a schematic diagram illustrating the arrangement of the display devices 31, 32 and 33 included in the display part 30 in the vehicle and the operation screen pages. FIGS. 10B and 10C illustrate a method of changing the operation valid display device assuming the arrangement of the display devices 31-33 and the operation screen pages shown in FIG. 9A.

As shown in FIG. 10A, in this example, in the same way as the above-described FIGS. 2A and 2B, the operating switch 10 includes the fixing switch DC and the direction instruction switches (the up switch US, the down switch DS, the left switch LS and the right switch RS) and is placed on the steering wheel. Further, the display devices 31-33 are arranged, side by side, in the direction from the left to the right, in the order of the display device 31, the display device 32 and the display device 33. Further, on the display devices 31-33, the operation screen pages are displayed, and, in the operation screen pages, the operation menus AA, BB, CC, DD, EE, FF, GG, HH and II as operation targets are arranged in the stated order in the direction from the left to the right over the display devices 31-33. From among the operation menus AA, BB, CC, DD, EE, FF, GG, HH and II arranged over the display devices 31-33, the operation menus AA, BB and CC are displayed in the operation screen page of the display device 31, the operation menus DD, EE and FF are displayed in the operation screen page of the display device 32 and the operation menus GG, HH and II are displayed in the operation screen page of the display device 33. These operation menus AA-II can be any operation menus such as a selection menu as to which one of the information screen pages for the in-vehicle devices should be displayed, a source selection menu for the audio system (i.e., a menu for selecting a source from among a radio, a CD, a DVD and so forth) and so forth.

Assuming the arrangement of the display devices 31-33 and the operation screen pages of FIG. 10A, the control part 20 determines the new operation valid display device (after the change) according to an instruction indicating an operation direction that is input through an operation performed on the operating switch 10 (an operation of the left switch LS or the right switch RS). Specifically, as shown in FIG. 10B, in a state where the display device 31 is the operation valid display device and the operation menu CC is selected, when the right switch RS is operated in a manner of a "short press operation", the control part 20 changes the operation valid display device into the display device 32 and brings the state where the operation menu DD is selected. In a state where the display device 32 is the operation valid display device and the operation menu DD is selected, when the left switch LS is operated in a manner of a "short press operation", the control part 20 changes the operation valid display device into the display device 31 and brings the state where the operation menu CC is selected. In a state where the display device 32 is the operation valid display device and the operation menu FF is selected, when the right switch RS is operated in a manner of a "short press operation", the control part 20 changes the operation valid display device into the display device 33 and brings the state where the operation menu GG is selected. In a state where the display device 33 is the operation valid display device and the operation menu GG is selected, when the left switch LS is operated in a manner of a "short press operation", the control part 20 changes the operation valid display device into the display device 32 and brings the state where the operation menu FF is selected. That is, the control part 20 changes the operation valid display device when an operation is performed on the operating switch 10 accompanied by the instruction to indicate the operation direction in the rightward direction same as the direction in which the operation menus are arranged or the opposite direction (leftward direction) and no operation menu is present in the operation direction in the operation valid display device. Further, in this change in the operation valid display device, the control part 20 determines the display device that displays the operation menu adjacent in the operation direction in the arrangement of operation menus as the new operation valid display device. Thereby, it is possible to acquire the advantageous effects same as those in the example of FIG. 8B.

Further, as shown in FIG. 10C, in a state where the display device 31 is the operation valid display device and the operation menu AA is selected, when the left switch LS is operated in a manner of a "short press operation", the control part 20 changes the operation valid display device into the display device 33 and brings the state where the operation menu II is selected. Also, in a state where the display device 33 is the operation valid display device and the operation menu II is selected, when the right switch RS is operated in a manner of a "short press operation", the control part 20 changes the operation valid display device into the display device 31 and brings the state where the operation menu AA is selected. That is, it is possible that the control part 20 changes the operation valid display device when no adjacent operation menu is present in the operation direction indicated by the instruction of an operation performed on the operating switch 10 in the operation valid display device and also no adjacent operation menu is present in the operation direction with respect to the currently selected operation menu in the arrangement of the operation menus. Further, in this change in the operation valid display device, the control part 20 determines the display device that displays the operation menu having no adjacent operation menu in the direction opposite to the operation direction in the arrangement of operation menus as the new operation valid display device. Thereby, it is possible to acquire the advantageous effects same as those in the example shown in FIG. 8C.

Note that in the above-described examples of FIGS. 8A-10C, when any operation target is present in the operation direction in the operation valid display device, the control part 20 changes the selection (switch the selection) of the operation target based on the operation signal accordingly. When such an operation direction is indicated by an instruction that is input as a result of the operating switch 10 being operated other than the direction of arranging the operation menus over a plurality of display devices and its opposite direction, it is possible that the control part 20 ignores the corresponding operation or, another operation function is provided and control is carried out according to the other operation function.

Concerning the above-described examples of FIGS. 8A-10C, the examples have been described where the direction of arranging the plurality of display devices included in the display part 30 is the same as the direction of arraigning the operation menus arranged over the plurality of display devices and the operation menus are displayed over the display devices in the order of arraigning the display devices. However, the directions and the orders of arranging the plurality of display devices included in the display part 30 can be different from those of arranging the operation menus arranged over the plurality of display devices. That is, the above-described methods/processes or so can be applied for a case where a plurality of operation menus arranged in a predetermined direction are displayed over a plurality of display devices included in the display part 30.

Further, in the above-described examples of FIGS. 8A-10C, the methods/processes of changing the operation valid display device caused by a "short press operation" performed on the operating switch 10 have been described. However, the above-described methods/processes of changing the operation valid display device can be carried out also for a case where an operation other than a short press operation is performed. Further, it is also possible that above-described methods/processes of changing the operation valid display device can be carried out for a case where a joystick or a momentary switch is employed instead of the operating switch 10 and the thus employed switch is used to perform an operation. Further, when a touch pad or a touch panel is employed instead of the operating switch 10, it is possible that above-described methods/processes of changing the operation valid display device can be carried out by an operation of a "single touch", a "double touch" or so. Furthermore, an operation for inputting an instruction indicating an operation direction on the touch pad or the touch panel can be implemented by a touch operation performed on the touch pad or the touch panel in such a manner of flicking the touch pad or the touch panel in the operation direction (a so-called "flick operation").

Thus, the vehicle information display apparatuses have been described by the embodiments. However, the present invention is not limited to these specific embodiments, and variations, modifications and/or replacements can be made on the embodiments without departing from the scope of the present invention.

For example, in the above-described embodiments, the methods of changing the operation valid display device among the plurality of display devices have been described. However, a similar changing method can be applied also to a case where a plurality of display areas are included in a single display device. That is, the methods described in the above-described embodiments can be applied to a process of changing (switching) a display area among the plurality of display areas in which an operation performed on the operating part 10 is valid ("operation valid display area"). For example, in a case where a display concerning a navigation system is placed in a left half area (left area) of a single display device and a display concerning a audio system is placed in a right half area (right area) of the same display device, the methods described in the above-described embodiments can be applied for changing (switching) the operation valid display area. Also, the display areas among which the operation valid display area is changed (switched) are not limited to those within a single display device. That is, the operation valid display area can be changed among display areas over a plurality of display devices. Also in this case, the methods described in the above-described embodiments can be applied. Further, the methods described in the above-described embodiments can be applied also for a case where such a plurality of display devices included in a display part 30 include those each including a plurality of display areas and those each including only a single display area in a mixed way. That is, it is possible that the display devices each including only the single display area are regarded as single display areas, respectively, and the operation valid display area is changed among the display areas over the plurality of display devices.

Below, technical ideas (1), (2), (3) and (4) derivable from the above-descried embodiments will be illustrated.

(1) A vehicle information display apparatus includes a plurality of display areas configured to display information concerning an in-vehicle device and be capable of displaying an operation screen page used for operating the in-vehicle device; an operating part configured to be used for performing an operation on the operation screen page displayed in the plurality of display areas; and a control part configured to receive an operation signal corresponding to the operation performed by using the operating part, control a display on the plurality of display areas and determine, based on the operation signal, an operation valid display area from among the plurality of display areas as a display area in which the operation performed by using the operating part is valid. A plurality of operation targets included in the operation screen page are arranged in a predetermined direction and are arranged over the plurality of display areas. The operating part is configured to be capable of being used to input an instruction indicating an operation direction. The control part is configured to change a selection of the operation target in the operation valid display area based on the operation signal, when an operation is performed on the operating part accompanied by an instruction indicating the operation direction same as or opposite to the predetermined direction and the operation target is present in the operation direction in the operation valid display area. The control part is configured to change the operation valid display area based on the operation signal, when an operation is performed on the operating part accompanied by an instruction indicating the operation direction same as or opposite to the predetermined direction and no operation target is present in the operation direction in the operation valid display area.

(2) In the above-described configuration (1), the control part can be configured to change the operation valid display area into the display area that displays the operation target adjacent in the operation direction in the arrangement of the operation targets, when an operation is performed on the operating part accompanied by an instruction indicating the operation direction same as the predetermined direction or opposite thereto, no operation target is present in the operation direction in the operation valid display area and the operation target adjacent in the operation direction is present in the arrangement of the operation targets.

(3) In the above-described configuration (1) or (2), the control part can be configured to change the operation valid display area into the display area that displays the operation target having no operation target adjacent in the direction opposite to the operation direction in the arrangement of the operation targets, when an operation is performed on the operating part accompanied by an instruction indicating the operation direction same as the predetermined direction or opposite thereto, no operation target is present in the operation direction in the operation valid display area and no operation target adjacent in the operation direction with respect to the currently selected operation target is present in the arrangement of the operation targets.

(4) In the above-described configuration (2) or (3), the plurality of display areas are arranged in the predetermined direction and are mounted in a vehicle, and the direction of arranging the plurality of the operation targets corresponds to the direction of arranging the plurality of display areas.

The present application is based on and claims the benefit of priority of Japanese Priority Application No. 2014-023647, filed on Feb. 10, 2014, the entire contents of which are hereby incorporated herein by reference.

What is claimed is:

1. A vehicle information display apparatus comprising:
a plurality of display areas that display information concerning an in-vehicle device, and are capable of displaying an operation screen page for operating the in-vehicle device;
an operating switch for performing an operation on the operation screen page displayed in the plurality of display areas, the operating switch being capable of receiving an instruction indicating an operation direction; and
a controller that:
receives an operation signal corresponding to an operation performed on the operating switch;
controls a display on the plurality of display areas;
determines, based on the operation signal, an operation valid display area from among the plurality of display areas as a display area in which an operation performed on the operation switch is valid;
executes, when a first operation is performed on the operating switch, an operation on the operation screen page in the operation valid display area based on an operation signal corresponding to the first operation;
changes the operation valid display area from a first operation valid display area to a second operation valid display area adjacent in a direction within a predetermined range from an operation direction indicated by a second operation, when the second operation is performed on the operating switch, and the display area included in the plurality of display areas is present in the direction within the predetermined range from the operation direction indicated by the second operation with respect to a position of the first operation valid display area, the first operation valid display area being disposed at a different location than the second operation valid display area; and
executes an operation on the operation screen page in the first operation valid display area based on an operation signal corresponding to the second operation, when the second operation is performed on the operating switch, and none of the plurality of display areas is present in any direction within the predetermined range from the operation direction indicated by the second operation with respect to the position of the first operation valid display area.

* * * * *